United States Patent [19]

Takaki

[11] Patent Number: 5,779,365
[45] Date of Patent: Jul. 14, 1998

[54] TEMPERATURE SENSOR FOR MEDICAL APPLICATION

[75] Inventor: Shunsuke Takaki, Sagamihara, Japan

[73] Assignee: Minnesota Mining and Manufacturing Company, St. Paul, Minn.

[21] Appl. No.: 436,435
[22] PCT Filed: Nov. 8, 1993
[86] PCT No.: PCT/US93/10719
  § 371 Date: May 24, 1995
  § 102(e) Date: May 24, 1995
[87] PCT Pub. No.: WO94/12859
  PCT Pub. Date: Jun. 9, 1994

[30] Foreign Application Priority Data

Nov. 25, 1992 [JP] Japan ................. 4-314852

[51] Int. Cl.$^6$ ................. G01K 11/00; A61B 5/00
[52] U.S. Cl. ................. 374/161; 252/408.1; 252/962; 128/736
[58] Field of Search ................. 374/161, 131; 252/962, 408.1; 128/736; 356/44

[56] References Cited

U.S. PATENT DOCUMENTS

| | | | |
|---|---|---|---|
| 4,016,761 | 4/1977 | Rozzell et al. | 374/161 |
| 4,136,566 | 1/1979 | Christensen | 374/161 |
| 4,201,446 | 5/1980 | Geddes et al. | 374/161 |
| 4,268,413 | 5/1981 | Dabisch | 252/408 |
| 4,288,159 | 9/1981 | Newman | 374/161 |
| 4,437,761 | 3/1984 | Kroger et al. | 374/161 |
| 4,523,092 | 6/1985 | Nelson | 374/161 |
| 4,749,856 | 6/1988 | Walker et al. | 374/161 |
| 5,052,820 | 10/1991 | McGinniss et al. | 374/131 |
| 5,385,404 | 1/1995 | Jones | 374/161 |

FOREIGN PATENT DOCUMENTS

| | | | |
|---|---|---|---|
| 2548779 | 1/1985 | France | 374/161 |
| 57-63430 | 4/1982 | Japan . | |
| 0005928 | 1/1984 | Japan | 374/161 |
| 62-85832 | 4/1987 | Japan . | |
| 0922538 | 4/1982 | U.S.S.R. | 374/161 |
| 2130719 | 6/1984 | United Kingdom | 374/161 |
| 87-05103 | 8/1987 | WIPO | 374/161 |

OTHER PUBLICATIONS

English Abstract of Japan (JP) 53043539, published 21 Nov. 1978.

Primary Examiner—Diego F. F. Gutierrez
Attorney, Agent, or Firm—F. Andrew Ubel

[57] ABSTRACT

A small sized temperature sensor for measuring temperatures in the body and for measuring temperatures in an extracorporeal blood circulation circuit, wherein the possibility of electrical shock and the cost are reduced, while resolution and reliability are increased. The temperature sensor comprises a source of light, an optical fiber to receive light from the light source at one end of the optical fiber, a transducer positioned near the other end of the optical fiber, a reflection means for reflecting the irradiated light, and an arithmetic processing unit which calculates temperature based upon the reflected light measured. The transducer is made up of at least two polymers that have different temperature dependencies of refractive index and form a microphase separation structure, wherein the polymers are cured products made from a cationically polymerizable compound having epoxy groups and a radically polymerizable compound having radically unsaturated groups.

12 Claims, 7 Drawing Sheets

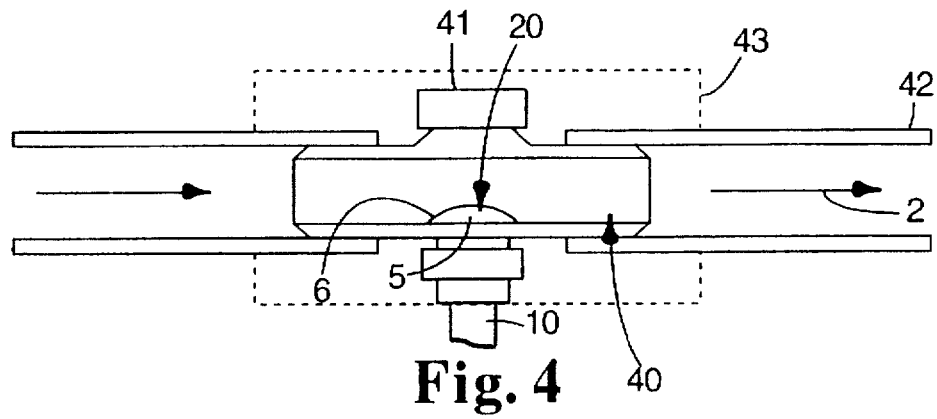
Fig. 4
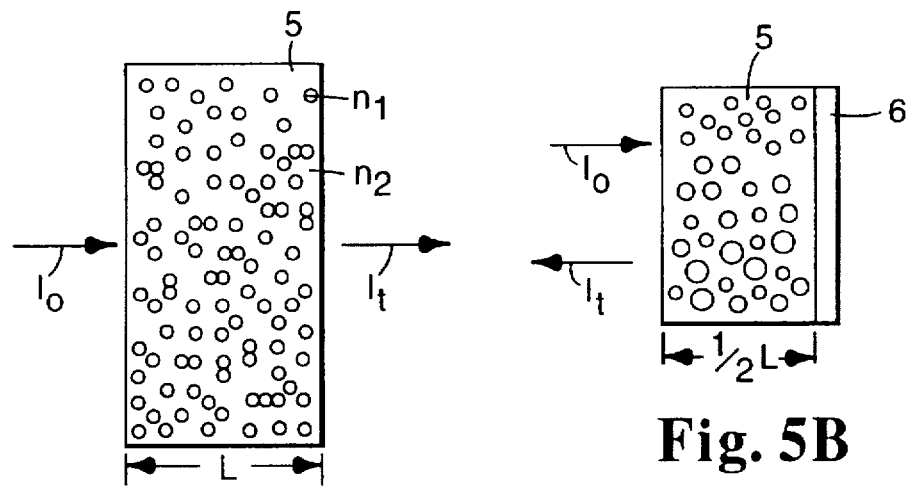
Fig. 5A  Fig. 5B
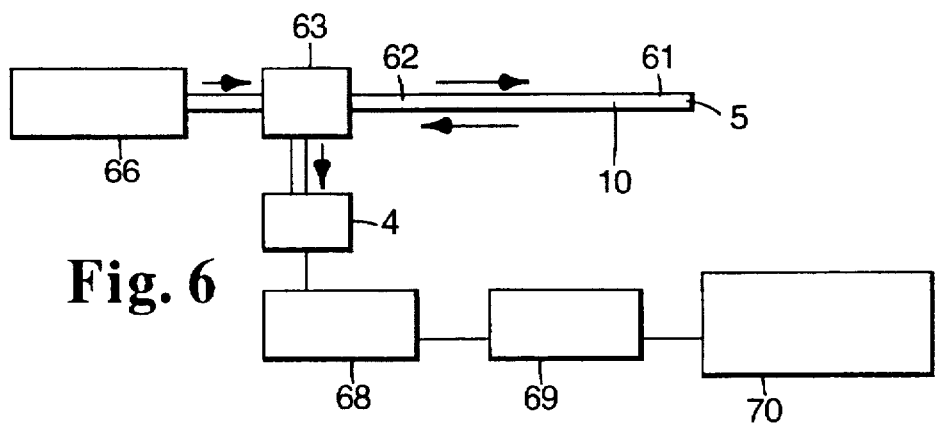
Fig. 6
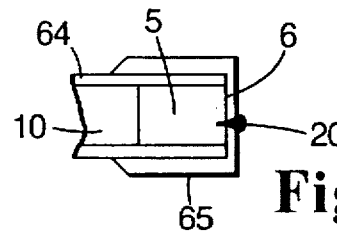
Fig. 6A

TEMPERATURE SENSOR FOR MEDICAL APPLICATION

FIELD OF THE INVENTION

The present invention relates to a temperature sensor for medical applications.

BACKGROUND OF THE INVENTION

For use in a microwave hyperthermia therapy against cancers, various thermometers have been used employing an optical fiber for measuring the temperature at local portions of a body. Optical thermometers have been used for the reasons that correct measurement is obtained without interference from electromagnetic waves and no electric shock is given to the living body. It is desired to use the optical thermometer not only for the hyperthermia apparatus but also for extracorporeal blood circulation instruments such as an artificial heart-lung device or an artificial dialysis device, as well as for probing the blood during cardiac catheterization, since it is capable of reducing the danger of electric shock.

At present, there have been proposed optical thermometers employing optical fibers in four principal systems.

A first system is a sensor using a semiconductor as a transducer. That is, the semiconductor usually exhibits an energy gap that varies depending upon a change in the temperature and, hence, exhibits an optical absorption and an accompanying light transmission spectrum that changes thereto. Therefore, there has been proposed an optical fiber sensor by utilizing such properties (see, for example, Japanese Unexamined Patent Publication (Kokai) No. 62-85832). For example, InGaAs and GaAs may be used as semiconductors. FIG. 9(A) shows an example of the constitution of a temperature sensor using such a semiconductor. A sensor 11 composed of the above semiconductor is fixedly provided to an end of optical fiber 10 on the side closer to a body that is to be measured, and a suitable reflector plate 12 is brought into contact with the sensor. Light having a suitable wavelength is permitted to be incident ($L_{IN}$) on the other end of the optical fiber; the incident light is reflected by the reflector plate 12 via the semiconductor sensor 11 and returns back to the incident end passing through the semiconductor sensor 11 again. The intensity of light at this moment is measured to determined the temperature of the body that is being measured. FIG. 9(B) shows a relationship between the wavelength of light in the semiconductor and the transmittance factor for a semiconductor sensor having a thickness of 250 μm, from which it will be understood that the transmittance changes depending upon the temperature. (Curve "A" illustrating the relationship at 53° C., and curve "B" illustrating the relationship at 40° C.) By utilizing these characteristics, therefore, it is possible to fabricate a temperature sensor which works depending upon light. However, this method lacks precision for a change in the temperature and has not been put into practical use in medical applications.

A second method is a sensor utilizing a change in the refractive index of a cladding material. According to this system, there is provided a temperature sensor in which, as shown in FIG. 10(A), a cladding 13 is removed from the end of the optical fiber 10, and a cavity 15 containing glycerine 14 therein, is formed at this portion (see, for example, Japanese Unexamined Patent Publication (Kokai) No. 59-160729). The refractive index of the glycerine 14 changes depending upon the temperature and, hence, the angle of reflection of light changes on the interface between the core 16 and the cladding 13. As a result, the intensity of light returning (i.e., reflected by the reflector plate 12) from the end of the fiber changes. Measuring the quantity of light that has returned makes it possible to measure the temperature.

That is, as shown in FIG. 10(B), the DC voltage that is converted through the sensor from the quantity of returned light undergoes a change depending upon a change in the temperature. Therefore, measurement of the DC voltage makes it possible to measure the temperature of the material being measured. In the sensor of this type, however, the end of the probe has insufficient strength. Moreover, it is difficult to fabricate the probe in a small size.

A third system is a sensor which utilizes a change in the color of liquid crystals. According to this system which utilizes a change in the color of liquid crystals depending upon the temperature, there is proposed a sensor obtained by fastening a cavity 15 made of a very narrow glass tube containing liquid crystals 17 at the end of the optical fiber 10 (see, for example, Japanese Unexamined Patent Publication (Kokai) No. 57-63430). FIG. 11 is a diagram illustrating its principle.

FIG. 11 shows a temperature sensor according to the above-mentioned third system, wherein a cavity 15 containing liquid crystals 17 is placed near the material that is to be measured, and an optical fiber 10 is connected to the cavity 15. An example consists of permitting the light to be input at a free end of the optical fiber 10, and measuring the light reflected by the liquid crystals, in order to calculate the temperature of the material that is being measured. That is, the principle is utilized that the color of the liquid crystals change depending upon the temperature, thus the reflection factor of the incident light changes.

According to this system, furthermore, the optical fiber 10 for incident light may be provided separately from the optical fiber 10' for measuring the reflected light. In this case, the optical fibers are used in a bundled form in which both optical fibers are bundled together.

However, this system is costly and has poor resolution. Moreover, if the glass tube is broken, the liquid crystals, which are toxic, adversely affect the living body.

Next, a fourth system is a sensor which utilizes a change in the intensity of a fluorescent material. That is, the wavelength of fluorescence of some fluorescent materials is shifted depending upon the temperature. The temperature sensor of this system utilizes this property. FIG. 12A, 12B, and 12C illustrate the principle of this system.

FIG. 12(A) shows that the fluorescence spectrum undergoes a change in intensity and wavelength depending upon the temperature of the sensor (here, it is presumed that the temperatures $T_1$, $T_2$, and $T_3$ have a relationship $T_1 < T_2 < T_3$). Curve "C" represents the spectrum of the excitation light. Curves D, E, and F represent the fluorescence spectrum of the material at temperatures $T_1$, $T_2$ and $T_3$ respectively. The fluorescent material having such properties may be GaAs/AlGaAs produced by Asea Co. or an inorganic fluorescent material produced by Luxtron Co. or Omron Co., and can be used as a temperature sensor.

FIG. 12B further illustrates such a sensor, wherein an optical fiber 10 is connected to a sensor 84 (shown in FIG. 12C) and a measuring device 80. The measuring device 80 comprises a light source 81 (e.g., a light emitting diode), a temperature analyzing portion 82, and a photodiode 83. The sensor 84 comprises layers of GaAs 85 and AlGaAs 86.

However, although these sensors are capable of taking and maintaining high resolution measurements, a problem resides in that the fluorescent materials are expensive.

U.S. Pat No. 5.052.820 discloses a temperature sensor with several different kinds of compositions which show. however, a very poor linearity and suitable only for single-point alarm systems. EP-A-868 discloses a device with reversibly changeable temperature dependent extinction of light with a transparent polymer matrix material and organic material dispersed in said matrix material.

SUMMARY OF THE INVENTION

The present invention provides a small sized temperature sensor for medical application for measuring local temperatures in the body and for measuring temperatures in an extracorporeal blood circulation circuit. which reduces the possibility of electric shock to the living body and features reduced cost. and increased resolution and reliability.

BRIEF DESCRIPTION OF THE DRAWINGS

FIG. 4 is a diagram for explaining a second embodiment of the temperature sensor for medical application according to the present invention.

FIG. 5A and 5B are diagrams explaining the construction of a polymer according to the present invention.

FIG. 6 and 6A are diagrams for explaining a third embodiment of the temperature sensor for medical application according to the present invention.

DETAILED DESCRIPTION OF THE INVENTION

Figure 1:
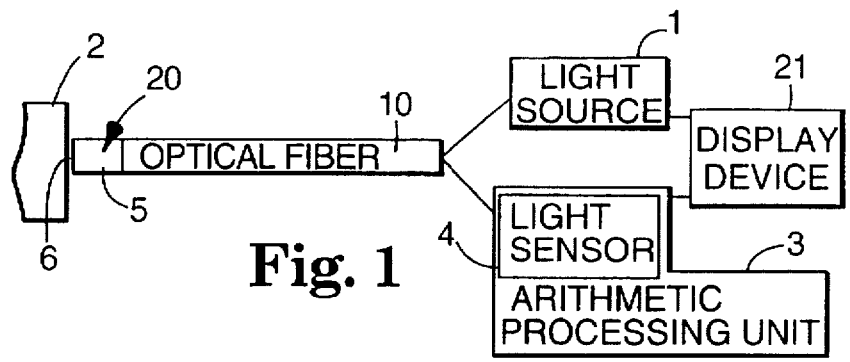
FIG. 1 is a block diagram illustrating the construction of a temperature sensor for medical application according to the present invention.

In order to improve the aforementioned defects inherent in the prior art, the object of the present invention is to provide a temperature sensor for medical applications such as measuring local temperature in the body or for measuring the temperature in the extracorporeal blood circulation circuit, which temperature sensor reduces the possibility of electric shock to the living body, is disposable, and features high resolution, high reliability and small size.

In order to solve the above-mentioned problems. the present invention employs the technical construction that is described below. More specifically, the invention relates to a temperature sensor for medical application which, at the time of measuring the temperature at a local portion of the human body, reduces the possibility of electric shock to the living body owing to the use of an optical means, and which features good precision and is disposable. That is, the invention relates to a temperature sensor for medical application comprising: a source of light; an optical fiber positioned at one end to receive light from said light source; a transducer near the other end of the optical fiber. said transducer being made up of at least two polymers that have dissimilar a different temperature dependencies of refractive index, a point of equal refractive index which is lower than 25° C. or higher than 45° C.. and a microphase separation structure; a reflection means for reflecting the irradiated light; and an arithmetic processing unit which receives the reflected light and calculates the temperature of the portion to be measured.

Here. the polymers have refractive indices that can be measured by using an ordinary refractive index meter. and should have temperature dependencies that are different over a temperature range from 25° to 45° C. which corresponds to the temperature of a living body of a human being.

Suitable polymers for use in the transducer of the present invention have a difference in refractive indexes greater than 0.0001 over the above-mentioned temperature range. Preferred polymers for use in the present invention have a difference in refractive index greater than 0.001.

In the present invention, the point of equal refractive index is specified to be lower than 25° C. or higher than 45° C. This is because, the above temperature range is the one in which the temperature sensors for medical applications are used, and the temperature may not be exclusively determined if the point of equal refractive index resides within that range.

Furthermore, the two or more polymers are specified to have a microphase separation structure. This is because, in the case of complete phase separation, handling becomes difficult and the measurement of temperature becomes incorrect. When the polymers are completely compatible, on the other hand, only one refractive index is exhibited and the light transmission factor no longer changes depending upon the temperature.

The microphase separation structure employed in the present invention refers to the condition where two or more polymers are phase-separated on the molecular level, or refers to the condition of a so-called "sea-island" structure.

The temperature sensor for medical applications according to the present invention employs the aforementioned technical construction. Namely, the temperature sensor causes the light transmission factor to change depending upon a change in the temperature, the temperature sensor being constituted of polymers which are provided in contact with a portion of which the temperature is to be measured or which are provided near the portion of which the temperature is to be measured. The intensity of light incident through the optical fiber is compared with the intensity of light that has passed through the polymer, and a change therebetween is detected in order to measure the temperature of the portion that is being measured.

In a preferred embodiment of the present invention, a light reflection means consisting of a suitable reflector plate is fitted to the polymers as an integrated structure, the light incident through the optical fiber is reflected by the light reflection means via the polymers and is then passed through the polymers again, and the reflected light is measured in order to measure the temperature of the portion being measured.

Embodiments of the temperature sensor for medical application according to the present invention will now be described in detail with reference to the drawings.

FIG. 1 is a diagram illustrating the components of an embodiment of the temperature sensor for medical application according to the present invention, which comprises a source of light 1 for irradiating light, an optical fiber 10 arranged between the portion 2 to be measured and the source of light 1, an arithmetic processing unit 3 which calculates the temperature of the portion 2 to be measured by receiving the reflected light from the end of the optical fiber which is close to the portion 2 to be measured, a polymer 5 which is provided at an end of the optical fiber 10 close to the portion 2 that is to be measured and of which the light transmittance changes depending upon the temperature, and a reflection means 6. It is desired that the arithmetic processing unit 3 in the present invention is provided with a light sensor 4.

Preferably, the polymer 5 is constituted integrally with a light reflection means 6 which may be any suitable light reflector plate or the like. It is desired that the light incident from a suitable source of light 1 pass through the optical fiber, be reflected by the light reflection means 6, and is returned back through the optical fiber to the arithmetic process unit 3 which executes a predetermined arithmetic process to calculate the temperature of the portion being measured.

Figure 2:
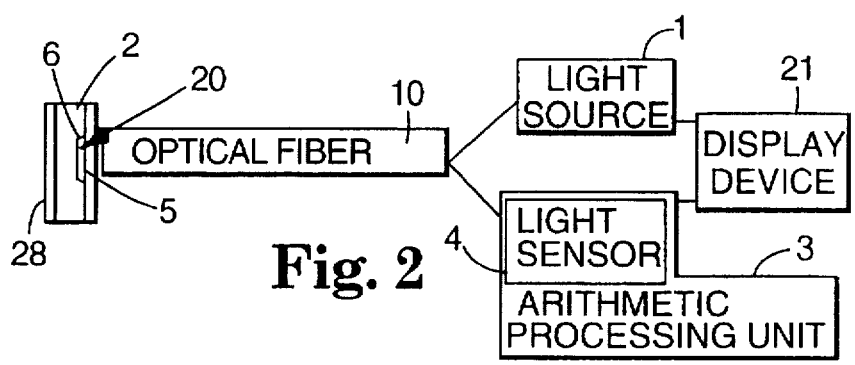
FIG. 2 is a block diagram illustrating another construction of the temperature sensor for medical application according to the present invention.

According to the present invention, furthermore, an optical transducer 20 (comprising the polymer 5 and the light reflection means 6) employed in the temperature sensor for medical applications, may either be fastened as shown in FIG. 1 to the end of the optical fiber close to the portion 2 to be measured or be placed as shown in FIG. 2 near the end of the optical fiber but being separate therefrom.

Figure 3:
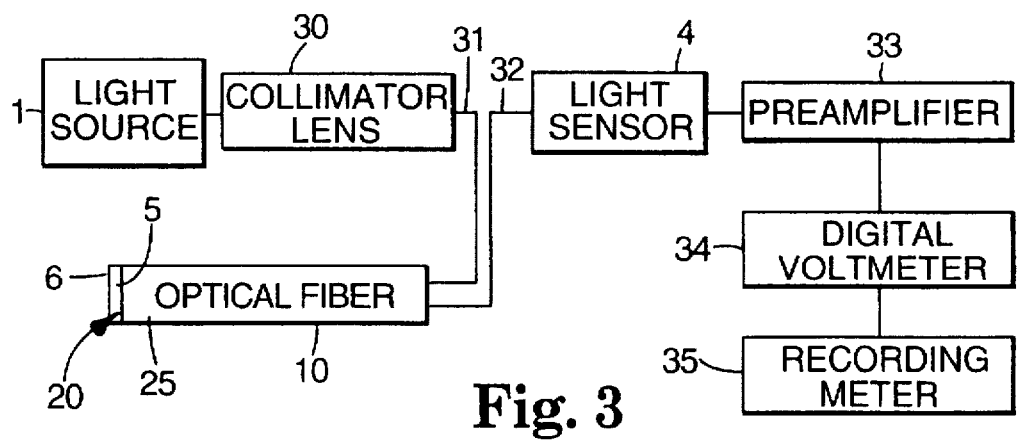
FIG. 3 and 3A are diagrams for explaining a first embodiment of the temperature sensor for medical application according to the present invention.

According to the present invention as shown in FIG. 3 and 3B, the temperature sensor unit 25 employs an optical transducer 20 which comprises the polymer 5 of which the light transmittance changes depending upon the temperature. Furthermore, a suitable light reflection means 6 is fitted to the polymer 5 as a unitary structure, and the reflection factor of light going out of the temperature sensor unit 25 after the light has fallen on and been reflected by the temperature sensor unit 25 changes depending upon the temperature of the portion 2 (not shown) to be measured.

Preferably and as described below are the constitution of the polymer used in the present invention and a method for its preparation.

First, FIG. 5(A) shows the mode of operation of the polymer 5 used for the optical transducer 20. The polymer 5 is obtained by curing a mixture of, for example, two or more kinds of polymerizable compounds (having different refractive indices when cured) and a suitable curing agent or agents. The polymer 5 possesses a domain phase structure $n_1$ of greater than 1 μm due to phase separation during the curing. The domain phase $n_1$ and the base phase $n_2$ have dissimilar refractive indexes and dissimilar temperature dependencies thereof. Therefore, the difference in the refractive index changes (e.g., increases) as a function of temperature, and scattering of light due to the domain phase changes causing the light transmittance of the cured product to change (e.g., decrease). Preferably, the length of the domain phase structure $n_1$ is greater than the wavelength of light emitted by the light source.

Here, it is desired that the temperature of equal refraction index be at least lower than the body temperature or be higher than 45° C.

Since the change in refractive index is reversible, the optical transducer 20 can be used for the measurement of temperatures. As an example of applying this material to the temperature sensor unit 25, a reflector plate 6 should be attached to one surface thereof as shown in FIG. 5(B) to facilitate measurement of the reflected light. The reflector plate 6 may be formed by depositing or adhering a thin metal film such as silver, aluminum or gold. Then, a change in the temperature can be detected as a change in the refractive index. This is found according to Rayleigh-Gans-Debye's equation shown below.

$$I_{(t)}/I_{(0)} = \text{Exp}(-QL)$$

$$Q = \frac{27}{8} \cdot \pi^2 \cdot \frac{a}{\lambda^2} \cdot \frac{(m^2-1)^2}{(m^2+2)^2}$$

$$m = n_2(\text{base})/n_1(\text{domain})$$

where, $I_{(t)}$: transmitted light intensity at T°

$I_{(0)}$: incident light intensity a: radius of domain n: refractive index

λ: wavelength

L: length of light path t: temperature function

According to the present invention, the temperature sensor for medical application measures temperatures over a range of from 25° C. to 45° C. A material having such sensitivity and linearity, curing conditions, thickness and wavelength should be determined as to obtain a resolution of 0.1° C. over this range. Specifically, a difference in the refractive index should be greater than $1 \times 10^{-4}$.

Suitable polymers 5 used for the present invention, include a cured product obtained by blending, for example, (1) a cationically polymerizable compound having epoxy groups (100 parts);

(2) a radically polymerizable compound having radically unsaturated groups (1 to 100 parts);

(3) a cationic polymerization initiator (0.1 to 10 parts); and (4) a radical polymerization initiator (0.1 to 10 parts).

Suitable cationically polymerizable compounds (1) include alicyclic, aliphatic and aromatic epoxy resins or the like. Preferred cationically polymerizable compounds include aromatic epoxy resins. Suitable radically polymerizable compounds (2) include acrylic or methacrylic monomers, oligomers or the like. Suitable initiator compounds (3) and (4) may be either those of the heat polymerizable type or the light polymerizable type. Desirably, however, compound (3) should be a heat polymerizable cationic polymerization initiator and compound (4) should be a light polymerizable radical polymerization initiator.

The thermometer using the above optical transducer 20 is constituted, as shown in FIGS. 1 and 2, of a temperature probe or a temperature cell made up of an optical fiber, a polymer and a reflector plate and a source of light and an arithmetic processing unit which includes a light sensor. As required, furthermore, there may be provided a display device 21 as illustrated in FIGS. 1 and 2.

The temperature sensors of the types shown in FIGS. 1 and 2 can be used as described below. That is, the temperature sensor of the probe type shown in FIG. 1 in which the optical transducer 20 is mounted on a single fiber having a small diameter, is used for the measurement of local temperatures in the living body, and the temperature sensor of the type shown in FIG. 2 in which a cell with a transducer is separately provided and being connected with a bundled fiber, is used for the measurement of temperatures in the extracorporeal circulation circuit.

The optical fiber 10 used in the present invention may either be a bundled fiber or a single fiber. The bundled fiber is branched into two on one end and to which are connected the source of light 1 and the light sensor 4. When the single fiber is used, there may be separately provided a beam splitter or a light coupler to guide the light returned from the optical transducer 20 to the light sensor.

As the source of light 1, there can be used a light emitting diode (LED), a semiconductor laser (LD), a xenon lamp, a halogen lamp or the like. As the light sensor 4, there can be used a photodiode, a photomultiplier, comprising CdS or the like.

In the temperature sensor of the present invention, the temperature is calibrated by utilizing two or more sources of heat whose values have been known. In the case of a single-fiber probe, the temperature sensor is calibrated by immersing the sensor in sterilized water maintained at, for example, 30° C. and 40° C. In the case of the cell, the calibration is effected by circulating sterilized water having a similar temperature.

Described below is a preferred method of producing the above-mentioned polymer 5 used in the present invention. The polymer 5 comprises an epoxy resin and an acrylic resin and can be used as a material that exhibits the aforementioned properties. Namely, a cured material comprising a blend as shown in Table 1 can be used as the polymer 5 and exhibits a linear response when adapted to measuring the body temperature over a given range. The curing consists of irradiation with ultraviolet rays of about 30.5 mW/cm² intensity and a heat treatment of 120° C. for 1 hour and then 150° C. for an additional 1 hour. When the source of incident light has a 850 nm wavelength, a temperature probe that uses the above material (2 mm in thickness) exhibits a sensitivity of −0.048 V/° C., a resolution of−0.021° C./mV, and a linear response between 25° C. and 45° C.

TABLE 1

| Ingredient | | Parts by Weight |
| --- | --- | --- |
| ERL 4221[1] | epoxy resin | 78 |
| M-113[2] | acrylic resin | 22 |
| BIBE[3] | acrylic resin light-curing agent | 0.4 |
| UVOX[4] | epoxy resin curing agent | 1.6 |

[1]"ERL 4221" = 3,4-epoxycyclohexylmethyl-3',4'-epoxycyclohexanecaloxyrate.
[2]"M-113" = $CH_2 = CHCO-(OC_2H_4)_4-O-C_6H_4-C_9H_{19}$.
[3]"BIBE" = benzoine isobutylether.
[4]"UVOX" = $Ar_3S^+SbF_6^-$.

Blending of a polymer that exhibits high sensitivity and a curing method have been developed. Table 2 shows an example of blending. The curing consists of first irradiating the blend with ultraviolet rays of 30.5 mW/cm² for five minutes and then heat treating the blend at 100° C. for 1 hour, then 150° C. for 1 hour, and then 200° C. for a final hour. The highly sensitive polymer was prepared by increasing the content of acrylic resin, selectively polymerizing the acrylic domain by using a light-curing agent, and then heat-polymerizing the epoxy phase after the acrylic domain has been formed. This makes it possible to obtain a "sea-island" type structure having a large phase separation factor. The phases having different refractive indices exhibit increased light scattering, making it possible to obtain a transducer that features high sensitivity. When the source of incident light has a 670 nm wavelength, a transducer which is 0.25 mm thick exhibits a sensitivity of−0.039 V/° C., a resolution of−0.026° C./mV, and a linear response between 25° C. and 60° C.

TABLE 2

| | | Parts by Weight |
| --- | --- | --- |
| ERL 4221 | epoxy resin | 56 |
| M-113 | acrylic resin | 44 |
| DEAP[1] | acrylic resin light-curing agent | 0.4 |
| CP-66[2] | epoxy resin thermal-curing agent | 1.1 |

[1]"DEAP" = 2,2-diethoxyacetophenone
[2]"CP-66" = a mixture of 1-(2-butenyl)-tetrahydrohiophenium fluoroantimonate and propylene carbonate available from Asahi Denka.

Figure 13:
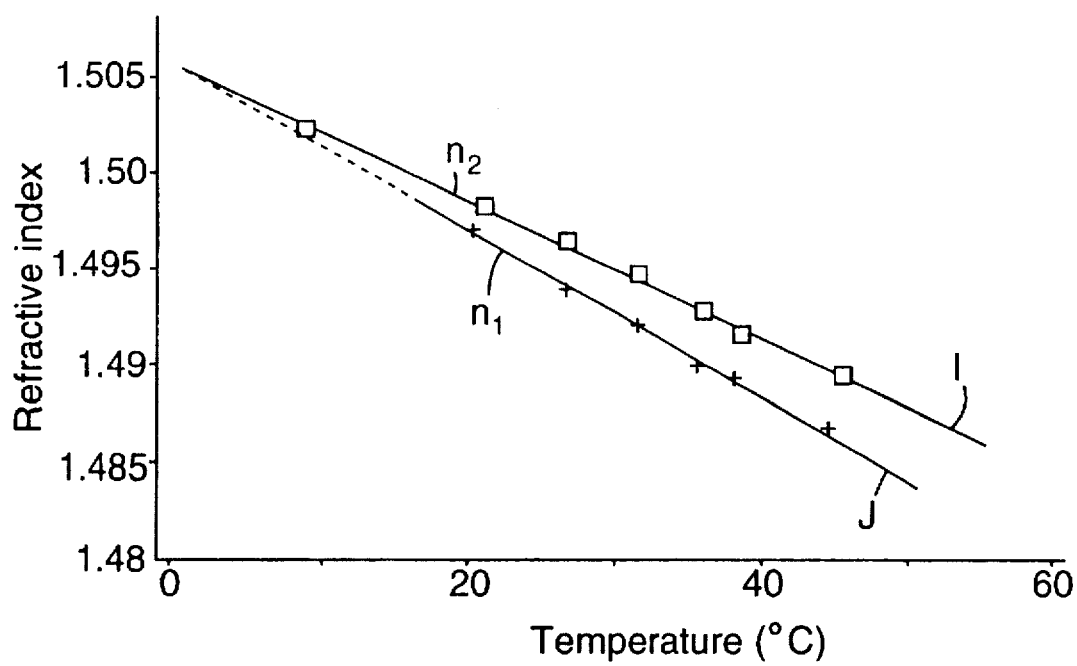
FIG. 13 is a graph showing relationships between the refractive indexes and the temperature dependencies of an epoxy resin (ERL 4221) which is a base phase-forming resin and an acrylic resin (M 113) which is a domain phase-forming resin.

FIG. 13 shows the relationship between refractive index and temperature of an epoxy resin (ERL 4221) which is a base phase-forming resin and of an acrylic resin (M 113) which is a domain phase-forming resin. These resins are used in the present invention as described in Tables 1 and 2 above. Line "I" shows a change in the refractive index $n_2$ of the epoxy resin (ERL 4221) depending upon the temperature. Line "J" shows a change in the refractive index $n_1$ of the acrylic resin (M-113) depending upon the temperature.

As will be apparent from FIG. 13, the refractive index $n_1$ of the acrylic resin (M-113) has a temperature dependency expressed by $n_1=1.5048-0.00039764 \times t$, and the refractive index $n_2$ of the epoxy resin (ERL 4221) has a temperature dependency expressed by $n_2=1.5062-0.00036576 \times t$.

As the temperature becomes high, the difference in the refractive index increases between the two resins, and thus the light passing through the polymer is greatly scattered and the transmittance of light decreases.

Figure 14:
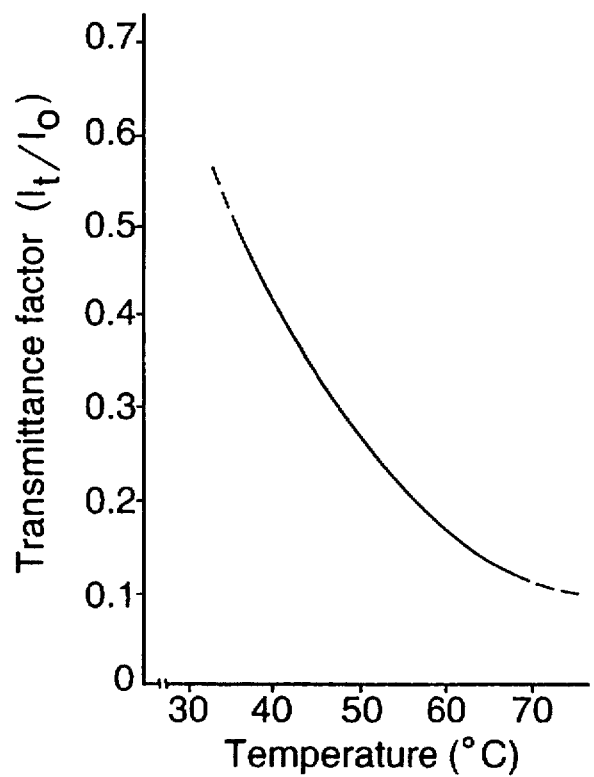
FIG. 14 is a diagram showing a relationship between the transmittance factor and the temperature dependency of a polymer of the micro phase separation structure comprising the epoxy resin and the acrylic resin.

FIG. 14 shows the relationship between the light transmittance factor and temperature of the microphase separation structure comprising the epoxy resin and the acrylic resin and having a mixing ratio as shown in Table 1. The ordinate of FIG. 14 represents the measured ratio $I_r/I_o$. As shown in FIG. 5(B), a light $I_o$ is incident on the other surface thereof and a light $I_r$ that is reflected is output from the polymer. The light used for the measurement has a transmitted wavelength of 632 nm.

As is clear from FIG. 14, the transmittance factor of the polymer abruptly drops with a rise in the temperature. In particular, the transmittance factor nearly linearly drops from a temperature of 32° C. to 50° C., which makes it possible to obtain a high resolution in measuring the temperature of the human body and the temperature of the blood, and, hence, makes it possible to correctly measure the temperature in such fields and to provide a device that is adapted to measuring the temperature in such fields.

Furthermore, the present inventors have studied a change in the transmittance factor that varies depending upon the temperature and have discovered that when the wavelength of light was fixed at 850 nm and the thickness of the sensor plate made of the polymer was set to 2 mm, the factor was maintained at a sufficiently high level when the diameter of domain particles was changed, for example, from 1 μm to 10 μm. Preferably, the diameter of domain particles was set at the higher side of the range and thus the sensitivity was improved, since the transmittance increases with an increase in the diameter of the domain particles.

By using the same wavelength, when the diameter of the domain particles was adjusted to be, for example, 2 μm and when the thickness of the polymer plate was changed from 0.5 mm to 4 mm, it was found that the sensitivity deteriorated as the plate thickness was decreased.

Furthermore, when the diameter of the domain particles was adjusted to be, for example 2 μm, the thickness of the polymer plate was set to 2 mm, and when the wavelength of light was changed from 400 nm to 1000 nm, it was found that the sensitivity was improved with a decrease in the wavelength.

By utilizing the aforementioned knowledge, it is possible to design a transducer that is best suited for measuring the temperature over a predetermined range.

Figure 3A:
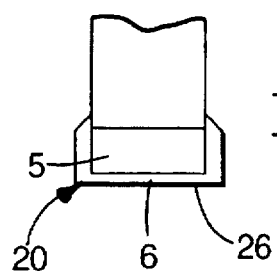

Next, as another embodiment of the temperature sensor of the present invention, a temperature probe was prepared by attaching a temperature transducer 20 made of the polymer 5 to a non-branched portion 25 of a two-branched random bundled fiber 10 using a transparent adhesive agent as shown in FIG. 3 and 3A. A silver-deposited film 6 was stuck to the transducer 20 of a thickness of 0.25 mm at the end of the probe to form a reflector plate, and a black paint 26 was applied around it to shield external light (as shown in FIG. 3A). The source of light 1 was a semiconductor laser having a wavelength of 670 nm, and the light was permitted input to the end 31 of the branched fiber through a collimator lens 30. The light reflected by the transducer unit 20 was taken out through another end 32 of the fiber and was measured for its intensity by using a light-receiving element 4 which consists of, for example, a silicon photodiode. The output signal was displayed as a voltage through a preamplifier 33 and a digital voltmeter 34 and was also displayed on a recording meter 35. The probe exhibited a sensitivity of –0.039 V/° C., a resolution of –0.026° C./mV, a linear response between 25° C. and 60° C., and a 95% response time of 30 seconds/70° C.

As a further embodiment of the temperature sensor of the present invention, a temperature sensor was prepared having a structure as shown in FIG. 4. That is, the transducer 20 consisting of the polymer 5 was not directly attached to the optical fiber 10 but was mounted on the measuring portion 2 and, then, the optical fiber 10 was fitted thereto to measure the temperature. In effect, the polymer 5 was adhered to the inside of the blood flow cell 40 which is made of, for example, a transparent polycarbonate and, then, a silver-deposited film 6 was adhered to form a reflector plate. The bundled fiber 10 for measurement can be fastened to the back side of the transducer 20 in the flow cell 40 maintaining a predetermined gap. A fastening fitting 41 also works to shield the external light falling on the cell 40. The flow cell 40 is disposable but must be calibrated before being used. The calibration instrument comprises a temperature controller, a standard temperature probe, and a sterilized water circulation circuit, and to which the cell is connected and is calibrated using two different temperatures. After calibration, the flow cell is connected to the blood circuit to take measurements. The temperature transducer is used not only as a single-function sensor but also as one function of a cell which is equipped with other sensors.

In this embodiment, furthermore, the flow cell 40 may be connected to a vinyl tube 42 or the like and the sensor unit covered with a light-shielding cover 43 that is separately formed. This embodiment is adapted to be used as a cell for measuring the temperature of an extracorporeal circulation circuit.

Referring to FIG. 6 and 6A, the temperature sensor has a construction suited for being used as a temperature probe having a small diameter for measuring the temperature of the hyperthermia therapy or for measuring local temperatures. The diameter is smaller than 1 mm. The fiber 10 comprises a quartz core, a polymer cladding and a jacket of a fluorine-containing resin. A transducer 25 was formed at one end 61 of the fiber 10 and a photocoupler 63 was attached at the other end 62. As shown in FIG. 6A, the polymer 5, having a liquid form, was poured into the fiber hole of a jacket 64, and the other end of the fiber was irradiated with ultraviolet rays using a collimator to form the acrylic domain, and then the epoxy phase was cured by heating. The cured polymer 5 was smoothly cut at a length of 0.25 mm to 0.5 mm beyond the end of the fiber in parallel with the end surface thereof, and a silver deposited film was adhered onto the cut surface to form a reflector plate 6. Instead of forming a deposited film, the cut surface may be directly coated with silver by, for example, vacuum vaporization. After the reflector plate 6 was formed, a black paint 65 was applied to the end to shield the external light. A light source unit 66 consisting of a light-emitting diode (LED) having a wavelength of 660 nm and a monitor sensor was employed, and the light produced was permitted to fall on the optical fiber 10 by using a collimator.

Figure 7:
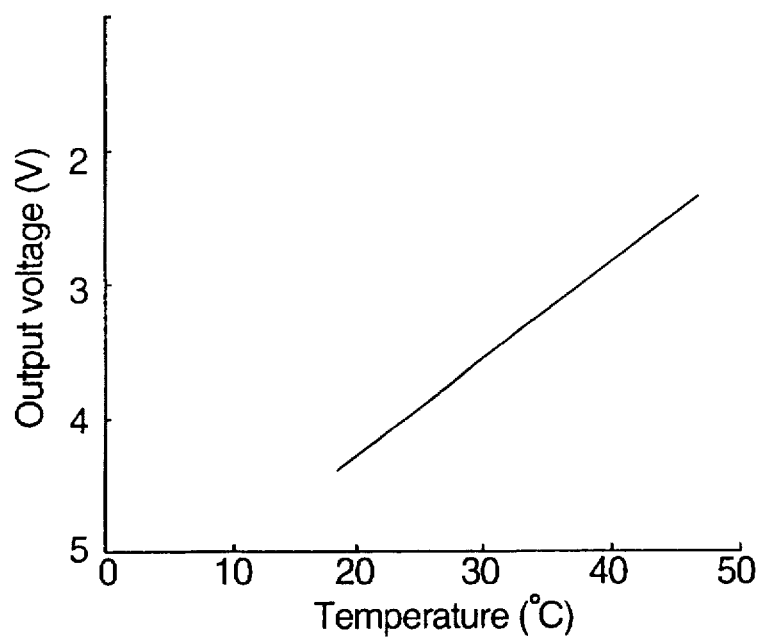
FIG. 7 is a diagram showing a calibration curve of the temperature sensor for medical application according to the present invention.
Figure 8:
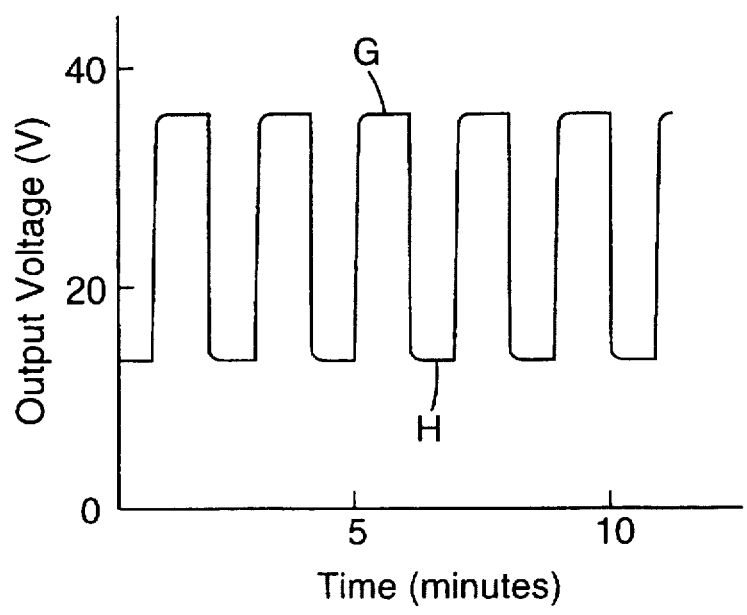
FIG. 8 is a diagram illustrating a temperature response curve of the temperature sensor according to the third embodiment of the present invention.
Figure 9A:
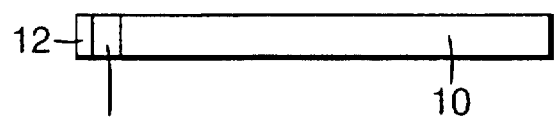
FIG. 9A and 9B are diagrams illustrating the construction of a temperature sensor unit in a conventional temperature sensor for medical application.
Figure 9B:
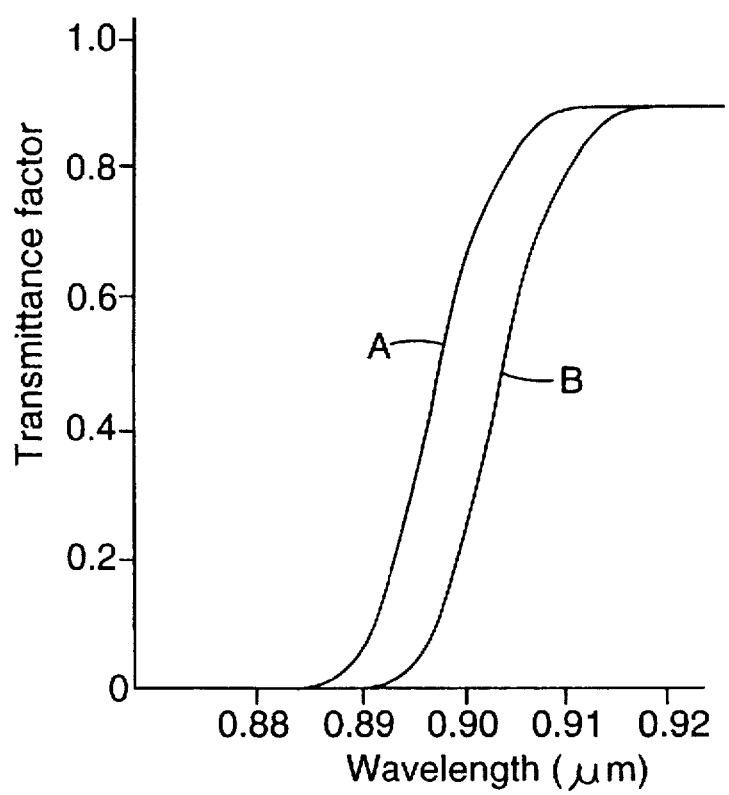
Figure 10A:
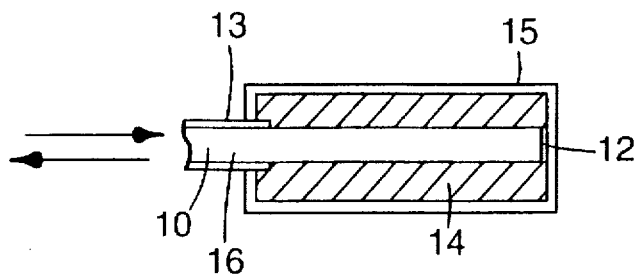
FIG. 10A and 10B are diagrams illustrating another construction of the temperature sensor unit in a conventional temperature sensor for medical application.
Figure 10B:
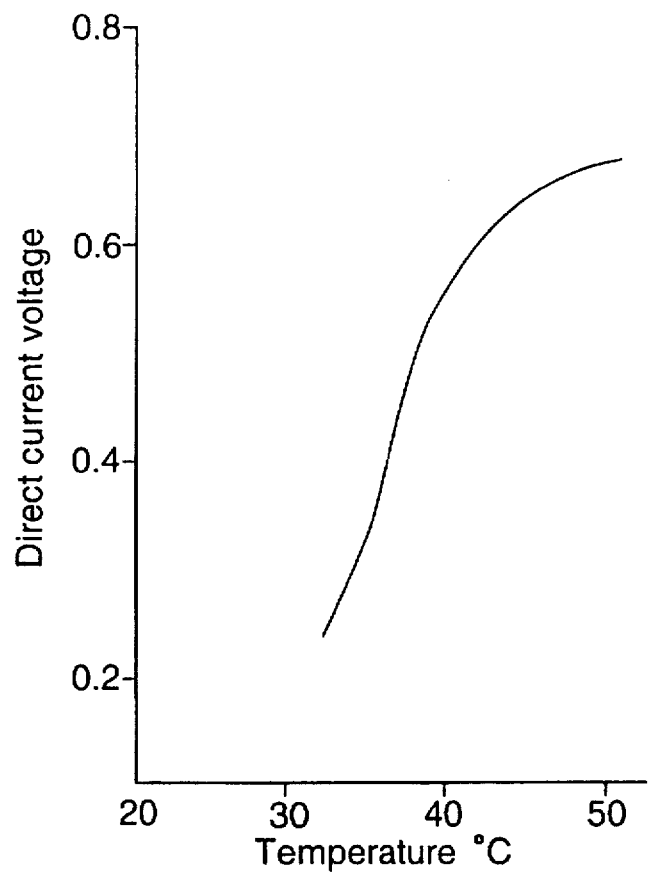
Figure 11:
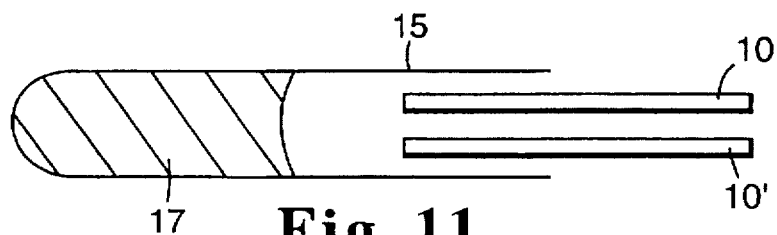
FIG. 11 is a diagram illustrating a further construction of the temperature sensor unit in a conventional temperature sensor for medical application.
Figure 12A:
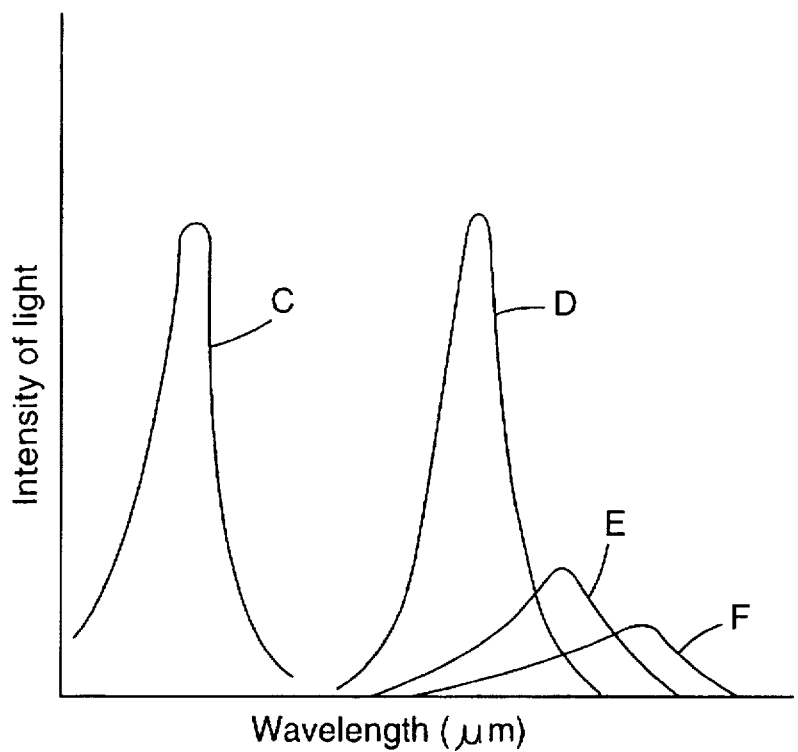
FIG. 12A, 12B, and 12C are is a diagrams illustrating a yet further construction of the temperature sensor unit in a conventional temperature sensor for medical application.
Figure 12B:
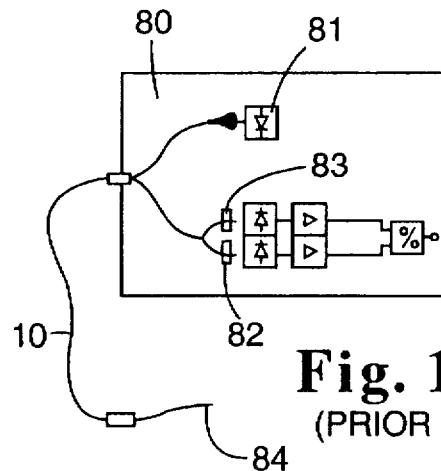
Figure 12C:
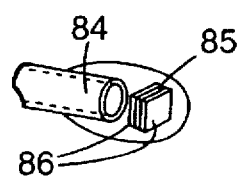

The incident light falls on the temperature probe passing through the photocoupler 63, and the reflected light is guided through the coupler 63 again to a detector 4 consisting of a photodiode. The output signal is displayed as a voltage through a pre-amplifier 68 and a digital voltmeter 69, and is further connected to a microprocessor 70 for processing. FIG. 7 shows a calibration curve of the temperature probe. The sensitivity was –0.077 V/° C., the resolution was –0.013° C./mV, and the probe had a linear response between 22° C. and 45° C. FIG. 8 shows a temperature response curve of the sensor of this embodiment. The response time was about 10 seconds when the sensor was moved from a 6° C. environment (shown as the voltage plateau "G") to a 75° C. environment (shown as the voltage plateau "H").

What is claimed is:

1. A temperature sensor, comprising:

a source of light which irradiates light;

an optical fiber positioned at one end to receive light from said source of light;

a transducer positioned near the other end of the optical fiber for reflecting the light delivered by the optical fiber, said transducer being made up of at least two polymers that have refractive indices with different temperature dependencies and form a microphase separation structure, wherein said polymers are cured products made from a cationically polymerizable compound having epoxy groups and a radically polymerizable compound having radically unsaturated groups;

a light sensor for receiving the reflected light; and an arithmetic processing unit which calculates a temperature based upon the reflected light received by said light sensor.

2. A temperature sensor according to claim 1, wherein said microphase separation structure of said polymers comprises a domain phase structure having a length greater than the wavelength of light emitted by said light source and a base phase surrounding said domain phase structure.

3. A temperature sensor according to claim 2 wherein said domain phase structure is in the form of dispersed particles having an average diameter between 1 and 10 microns.

4. A temperature sensor according to claim 1, further comprising a reflection means for reflecting the irradiated light, wherein said reflection means comprises a reflector plate integrally fitted to said transducer.

5. A temperature sensor according to claim 4, wherein said reflector plate is a metal film selected from the group consisting of silver, aluminum, and gold.

6. A temperature sensor according to claim 1 wherein said cationically polymerizable compound is selected from the group consisting of epoxy resins.

7. A temperature sensor according to claim 1 wherein said radically polymerizable compound is selected from the group consisting of acrylic and methacrylic resins.

8. A temperature sensor according to claim 1, wherein said optical fiber comprises a bundle of individual filaments.

9. A temperature sensor according to claim 8, wherein said bundle is branched into two portions at one end such that ine portion is positioned to receive light from said light source and is positioned to transmit reflected light to said light sensor.

10. A temperature sensor according to claim 1, wherein said light sensor is selected from the group consisting of photodiodes and photomultipliers.

11. A temperature sensor according to claim 1, further comprising a transparent blood flow cell and wherein said polymers of said transducer are mounted on the inside wall of said blood flow cell.

12. A temperature sensor according to claim 1, wherein said temperature sensor has a diameter smaller than 1 mm.

* * * * *